(12) United States Patent  (10) Patent No.: US 9,282,094 B1
Hunold et al.  (45) Date of Patent: Mar. 8, 2016

(54) TRANSPARENT ADAPTIVE AUTHENTICATION AND TRANSACTION MONITORING

(71) Applicant: EMC Corporation, Hopkinton, MA (US)

(72) Inventors: Philipp Hunold, Hoboken, NJ (US); Daniel Chapman, Los Altos, CA (US)

(73) Assignee: EMC Corporation, Hopkinton, MA (US)

( * ) Notice: Subject to any disclaimer, the term of this patent is extended or adjusted under 35 U.S.C. 154(b) by 9 days.

(21) Appl. No.: 14/318,068

(22) Filed: Jun. 27, 2014

(51) Int. Cl.
  *G06F 21/00* (2013.01)
  *H04L 29/06* (2006.01)
  *G06F 21/55* (2013.01)

(52) U.S. Cl.
  CPC .............. *H04L 63/083* (2013.01); *H04L 63/14* (2013.01); *G06F 21/554* (2013.01)

(58) Field of Classification Search
  CPC ............................. H04L 63/14; G06F 21/554
  See application file for complete search history.

(56) References Cited

U.S. PATENT DOCUMENTS

| | | | | |
|---|---|---|---|---|
| 8,601,152 | B1* | 12/2013 | Chou | H04L 63/0428 709/236 |
| 8,918,387 | B1* | 12/2014 | Sokolov | G06F 17/30 707/707 |
| 2002/0059528 | A1* | 5/2002 | Dapp | H04L 63/1458 726/23 |
| 2004/0064351 | A1* | 4/2004 | Mikurak | G06Q 10/087 705/22 |
| 2006/0282660 | A1* | 12/2006 | Varghese | G06Q 20/341 713/155 |
| 2009/0063667 | A1* | 3/2009 | Smith | G06Q 10/02 709/222 |
| 2012/0128367 | A1* | 5/2012 | Yamada | H04B 10/1149 398/118 |
| 2013/0268357 | A1* | 10/2013 | Heath | H04L 63/00 705/14.53 |
| 2013/0346524 | A1* | 12/2013 | Barlow | H04L 51/00 709/206 |
| 2014/0337951 | A1* | 11/2014 | Lee | H04L 63/1416 726/7 |

OTHER PUBLICATIONS

Waldecker, "A Review on IRC Botnet Detection and Defence". (2011) In: Kaspersky IT Security for the Next Generation European Cup 2011, Erfurt, Germany, S. pp. 1-9.*

* cited by examiner

*Primary Examiner* — Hadi Armouche
*Assistant Examiner* — Ali Shayanfar
(74) *Attorney, Agent, or Firm* — BainwoodHuang

(57) ABSTRACT

Enhanced security processes are integrated into online service provider workflow activities in a transparent fashion with little or no impact on the servers. Enhanced security processes may include adaptive authentication and transaction monitoring. The enhanced security processes are partially implemented in a network device, such as a network communication device, a firewall, or a load balancing system, or a separate security device, rather than being implemented in the server systems hosting on-line websites. With such an arrangement, server software is minimally modified or rewritten, and third party software, such as security applications, remains in operation.

20 Claims, 3 Drawing Sheets

TRANSPARENT ADAPTIVE AUTHENTICATION AND TRANSACTION MONITORING

BACKGROUND

On-line service providers, for example a banking website, may need to properly identify on-line customers and clients to prevent fraudulent transactions. In some situations the use of a registered username and a password associated with the username may provide sufficient security for an on-line transaction to proceed. In other situations an on-line service provider may need additional identification information to safely permit an on-line transaction to continue. For example, a bank website may employ a risk engine of a risk-based authentication system to assign risk scores to banking transactions where higher risk scores indicate higher risk. The bank may use an adaptive authentication engine to determine if a step-up authentication process is needed in order to safely approve a particular transaction having a higher risk score.

A step-up authentication process may include requesting more identifying information from the on-line customer in addition to the registered username and the password associated with the username, or may include contacting the on-line customer via an out-of-band communication method. As an example, the on-line service provider may text the client using a registered cell phone number. An on-line service provider may choose to use a step-up authentication process if something about a transaction indicates that the transaction is not as expected. For example, the amount of the transaction may be larger than any previous transaction executed by that particular customer, or the time of the transaction may not be typical, or the location of the transaction may be from a different continent than a transaction by the same customer on the previous day. A step-up authentication may be done by software code installed on a server hosting the on-line service.

SUMMARY

It may be desirable to incorporate security functions such as adaptive authentication and transaction monitoring into existing service provider systems executing service applications that are not designed to include such functions. For such a system, it is typically necessary to modify the service application to incorporate the new security functions being added. For example, a service application may employ a simple login processing workflow requiring only that a valid user password be presented to authenticate a user. In order to incorporate new security features, the login processing workflow must be modified to accommodate the new features. For example, the processing workflow improvements may include steps such as collecting additional user information, making calls to additional services, using new logic to accommodate different conditions and results, etc.

Unfortunately, there are deficiencies with the above described conventional authentication and transaction monitoring methods. For example, integrating step-up security systems running in-line with already existing security systems in an on-line service provider involves rewriting the software code used in the server that hosts the service provider's website. The rewritten code must be designed, implemented and tested to determine complete functionality and remove code errors or code incompatibilities. Additional work on integrating the increased security process for on-line service providers may include obtaining approval for potentially risky software changes and lost production time for the server being upgraded. There may also be costs for re-allocating engineering resources, building web page GUIs to display the request for additional information from the customer, and changing the operating logic of the website to accommodate the challenging, allowing and denying access steps to customers of the website resource.

Another disadvantage to conventional methods is the difficulty in integrating increased security into third party software such as web applications. Additionally, in situations having multiple server systems operating a large series of websites, the conventional methods of upgrading security involve software changes in each of the servers. Integrating conventional authentication upgrades involves changes that are not transparent to the service provider.

In contrast to conventional integration methods for increased security methods in on-line service providers, an improved technique is transparent to the servers and reduces the effort involved in implementing increased security, for example in legacy systems. The improved technique intercepts and re-routes communications between a server and a client. The re-routed communication is redirected to a device, which may be referred to as a challenger, where it is stored in memory and where increased security procedures are performed. The increased security may include contacting the client for additional security information, adaptive authentication and transactional monitoring. The improved technique involves little or no change to the server software code and is essentially transparent to the server.

One embodiment of the improved technique is directed to a method for adding increased security to communications exchanged between a server and a client device. The improved technique includes receiving an intercepted and re-routed communication between the server and the client device, storing the re-routed communication in a memory, and communicating with the client device, for example requesting additional security information. The technique includes performing a security operation including the additional security information and generating a security decision. The technique includes sending the stored communication to the intended recipient when the security decision indicates that it is safe to continue, and preventing the stored communication from being sent when the security decision indicates that it is not safe to continue.

The technique further includes determining whether the re-routed communication requires increased security, and transmitting a call to a security analysis device for generating a step-up security decision including information related to the intercepted communication. The technique includes transmitting a challenge to the client when the step-up security decision indicates that a step-up security procedure is indicated, and performing the security operation using security information that includes the additional security information. The technique includes receiving a response to the challenge from the client and comparing the response to information in the memory to determine confirmation.

In one embodiment, the improved method is implemented using a computer program product having a non-transitory, computer-readable storage medium which stores code including instructions for adding increased security to communications exchanged between a server and a client device.

Another embodiment of the improved technique is directed to a system for integrating security operations into a server workflow transparently to the server. The system includes a controller, a memory device, a local area network communicatively coupled to an external client by at least one network gateway device, at least one server hosting a resource communicatively coupled to the local network, a challenger communicatively coupled to the at least one network gateway device and communicatively coupled to a security analysis device. The challenger maybe a separate physical device, or software implemented in another device of the system. The network gateway device is constructed and arranged to intercept and redirect communications between the server and the external client to the challenger. The challenger is constructed and arranged to store information from the redirected communication in the memory, transmit a call containing security information from the redirected communication to the security analysis device, and receive a security analysis from the security analysis device. The system can transmit a challenge to the client, receive a response to the challenge from the client, and compare the response from the client to information in the memory. The system will then generate a decision on continuing the communication when the comparison to the information in the memory indicates a valid response.

Using the improved methods and systems allows integrating improved security operations into a server workflow where the server is using older security systems, with the increased security processes added transparently to the server.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique integrates enhanced security processes, such as adaptive authentication and transaction monitoring, into online service provider transactions in a transparent fashion with little or no impact on the servers. The enhanced security processes are implemented as part of a network rather than as part of the server systems hosting on-line websites. Network devices that may be utilized in part of the improved technique may include communication devices, such as a network gateway, a firewall or a load balancing system, and separate security devices, such as an adaptive authentication device or a challenger.

Figure 1:
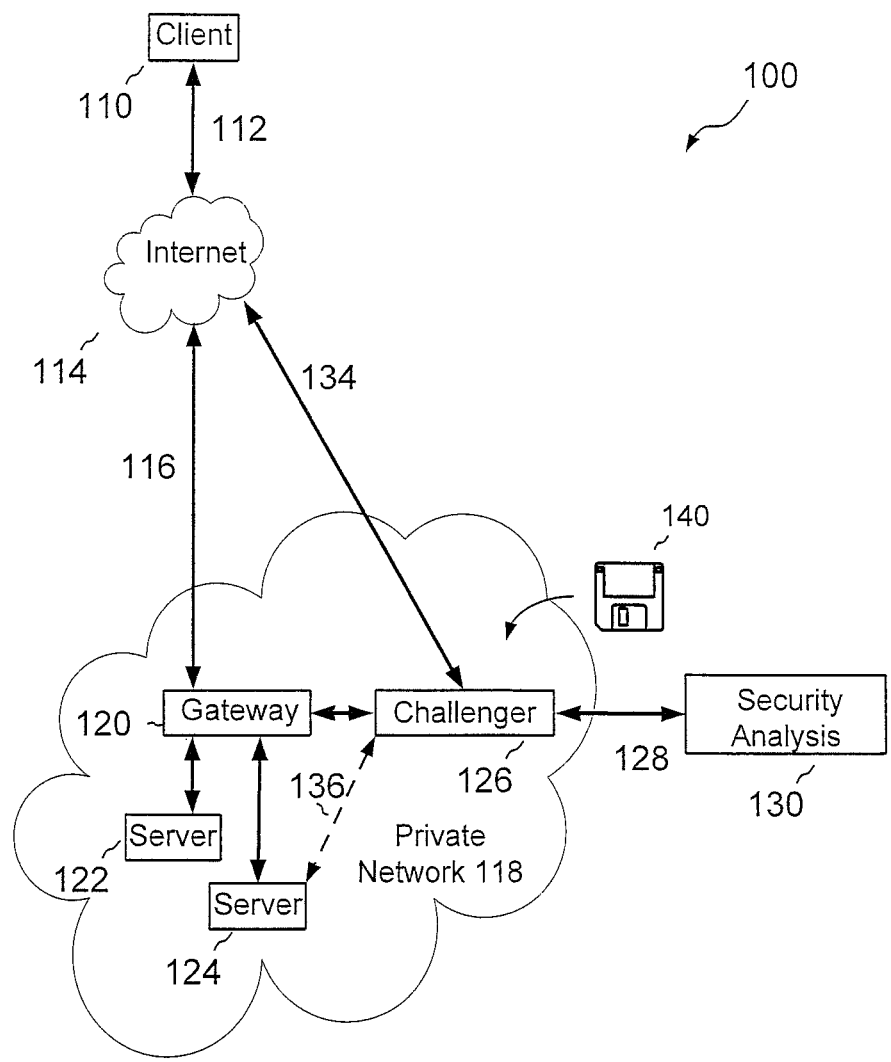
FIG. 1 is a schematic diagram illustrating an environment for carrying out the improved technique.

FIG. 1 is a schematic diagram illustrating an environment for carrying out the improved technique. An electronic environment 100 includes at least one client 110, which communicates a request via a communication channel 112, and a public network, such as the internet 114 or World Wide Web, to a server 122, 124. The client 110 communication channel 112 may be a wired or wireless communications medium and may be a bidirectional channel or two unidirectional channels enabled for electronic transmission delivery. The public network or internet 114 is connected via communication channel 116 to a private network 118. The private network 118 may be a local area network or a wide area network, and may communicate with electronic devices outside the private network via gateway 120. The gateway 120 may also include a firewall and/or a load balancer, and is located between the server 122, 124 and communication channel 116.

In this described embodiment, the client 110 is an external client/customer who is not part of the private network 118, but the system is not so limited. In the case of an external client 110 the communication may be a login/logon request, a transaction request, or other interaction between electronic systems. The gateway 120 may be directly connected to the internet 114 by the communication channel 116, as shown. The gateway 120 may be a communication device, a firewall device, a load-balancer device, as a proxy device, or other devices used in communicating between portions of private network 118 and external devices such as client 110. The gateway 120 is shown as including communication channels from servers 122 and 124, but the system is not so limited. There may be any number of servers connected to the gateway 120, and there may be any number of gateways, which may act in parallel.

The gateway 120 is connected to a challenger 126, such that a message directed toward client 110 may be intercepted and re-routed for increase security procedures, for example, an adaptive authentication process for a logon request. The challenger 126 may be a separate device as shown, or it may be a portion of the gateway 120 or other device. The challenger 126 is connected via channel 128 to a security analysis device 130. Channel 128 is shown as being a separate communications channel to a device that is outside the private network 118, but the apparatus is not so limited. The challenger channel 126 may use the gateway 120 and the internet 114 to connect to security analysis device 130. Alternatively, security analysis device 130 may be a part of private network 118, and communicate using internal network channels.

The challenger 126 may optionally communicate with server 122, 124, either via the gateway 120, or via a separate internal communication channel 136. The challenger 126 may communicate via channel 134 with the client 110. The challenger 126 may include a non-transitory, computer-readable storage medium 140 for programing actions of the device.

Security analysis device 130 may include an adaptive authentication system, a transaction monitoring system, or other security devices. The security analysis device 130 may be a separate device located outside the private network 118 as shown, but the system is not so limited. Security analysis device 130 may be a part of the challenger 126 or part of the gateway 120. The security analysis device 130 may be external to the private network 118, as shown, and connected to the challenger 126 by a separate communication channel 128, or via the internet 114 or it may be a separate device contained within the private network 118 and communicate with the challenger by internal communication channels.

Figure 2:
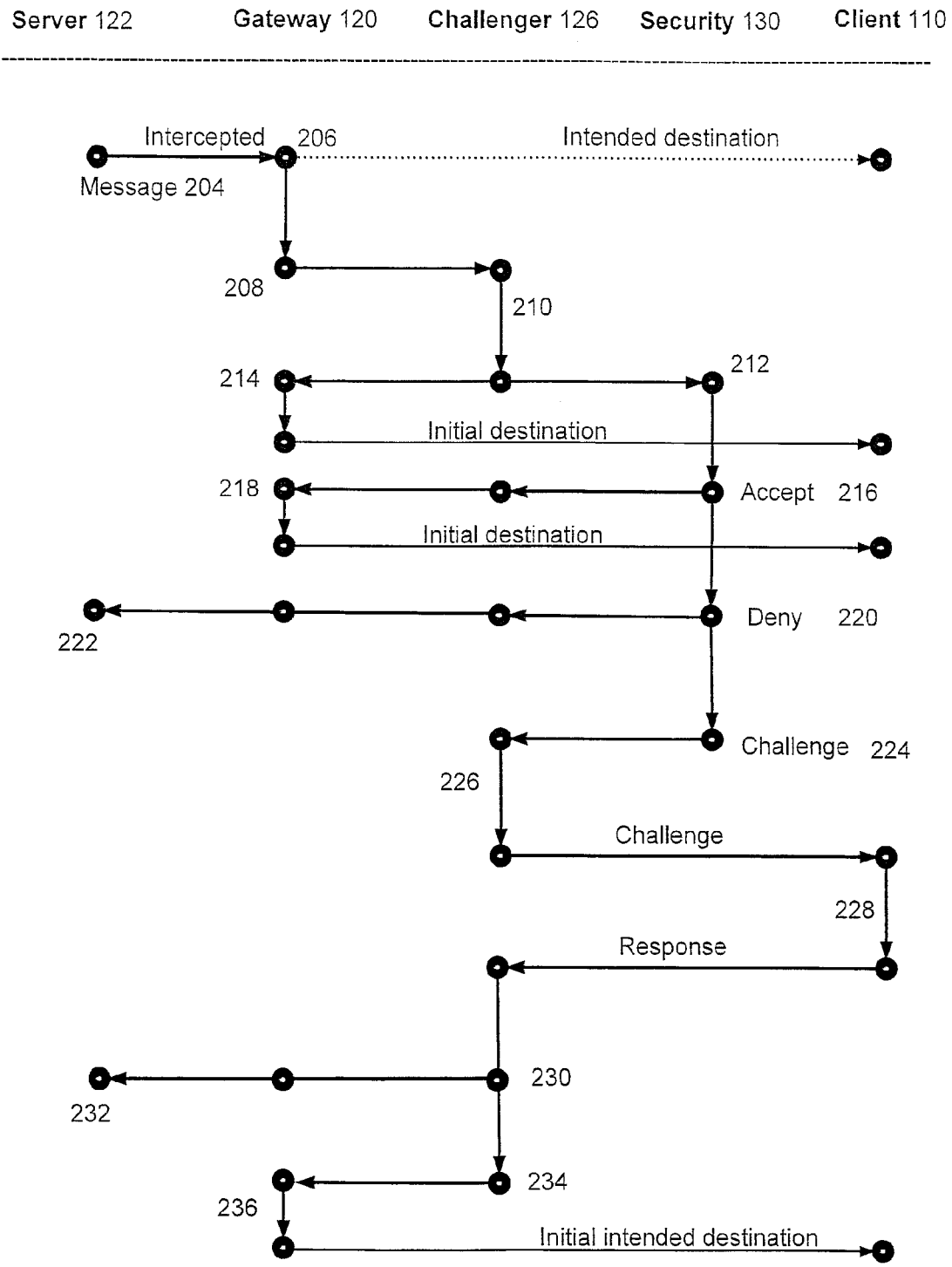
FIG. 2 is a flow chart illustrating a process for an embodiment of the improved technique.

FIG. 2 is a flow chart illustrating a process for an embodiment of the improved technique, in particular an adaptive authentication of a logon request. In this embodiment, server 122 has received a logon request from an external client 110 including a username and a password. The server 122 authenticates client 110 by comparing the username and password with values stored in a memory of server 122, and sends client 110 an approval including an address for client 110 to access the desired resource, for example the client's bank checking account. Server 122 may provide a redirection command to the resource in the approval message 204. The approval message 204 is directed to the client 110, but is intercepted at 206 by the gateway 120 and redirected to the challenger 126 at 208 for increased security processing. Thus, message 204 does not reach its intended destination of client 110 at this time, but rather is redirected for further processing at the challenger 126. All messages 204 may be intercepted and sent to the challenger 126 in some embodiments.

At 210 the challenger 126 stores the message 204 in a memory location until the increased security process is completed. In some embodiments the challenger 126 determines that the message 204 is a logon request, that logon requests are of a type of message that should undergo increase security checking, and the challenger 126 sends a call containing details regarding the message to the security analysis device 130 at 212. If the message 204 is determined to not undergo increased security, then the challenger 126 sends the stored message back to the gateway 120, which at 214 resumes sending the message 204 to the client 110, which was the message's initial destination.

Security analysis device 130 performs an increased level of security screening on message 204. For example, if message 204 is a logon request, security analysis device 130 may be an adaptive authentication process looking at a transaction history, current geographical location, time of day, a device fingerprint, or other adaptive authentication factors for client 110 to determine a risk of fraud in the logon request for access to a resource.

If the risk of fraud is found to be low at 216 security analysis device 130 will transmit an accept to challenger 126, which will send the stored message 204 back to the gateway 120, which at 218 resumes sending the message 204 to the client 110, the initial destination of the message.

If the risk of fraud is high at 220 security analysis device 130 will transmit an deny message to challenger 126, which does not send the stored message to the gateway 120, and the message 204 at 222 is not sent to the client 110. At 222 the gateway 120 may send a notice of the deny decision to the server 122. Alternately, in some embodiments the gateway 120 may send a notice of the deny decision to the client 110, where the notice may be in the form of a redirection command to a failure to authorize webpage. In other embodiments, the server 122 at 222 may send a failure to authorize message to a memory device, to a database, to an action center, and/or to the client 110.

If the risk of fraud is moderate at 224 security analysis device 130 will send a challenge message to the challenger 126. The challenge message may contain information for the challenge to the client 110 in some embodiments, or the challenger 126 may formulate and transmit a challenge question to the client 110 at 226 in other embodiments. The challenge question may be a series of questions including more detail than the username and password, or it may be an out-of-band communication to the client 110, for example, a text message to the client's cell phone including a code that the client 110 may use to prove possession of an item known to belong to the client. Possession of the client's cell phone as well as knowing the username and password may provide sufficient authentication of the client device 110. Other enhanced security measures may also be used and several iterations of challenge question and reply may be needed to obtain proper security levels. In some embodiments the challenger 126 may transmit another call to the security analysis device 130 including the client challenge response for additional analysis.

The client 110 at 228 provides a response to the challenge question to the challenger 126. The response may include further information, such as the client's mother's maiden name, or it may be a code sent to the client by text message, or other forms of increased security response.

Challenger 126 compares the challenge response to values stored in a memory, and if the response fails to match the stored values at 230 the challenger 126 transmits a deny message to the gateway 120 and server 122 at 232, and the message 204 is not transmitted to the client 110. In some embodiments the gateway 120, or the server 122, transmit a redirect to a failure to authorize page to the client 110.

When the challenge response matches the stored values the challenger 126 at 234, which will send the stored message to the gateway 120, which at 236 resumes sending the stored message 204 to the client 110.

In the described embodiment, the gateway 120 intercepts the transaction at 306 and redirects it to the challenger 126 using, for example, an interface service such as ICAP or other anti-virus or malware filtering protocols, but the improvement is not limited to these methods. The described communications between the challenger 126 and the security analysis device 130 may use a protocol such as SOAP/XML API (simple object access protocol/extensible markup language application programming interface), or REST API, for the communication. Any computer language or protocol may be used, such as Java. Other languages and protocols may be used.

Figure 3:
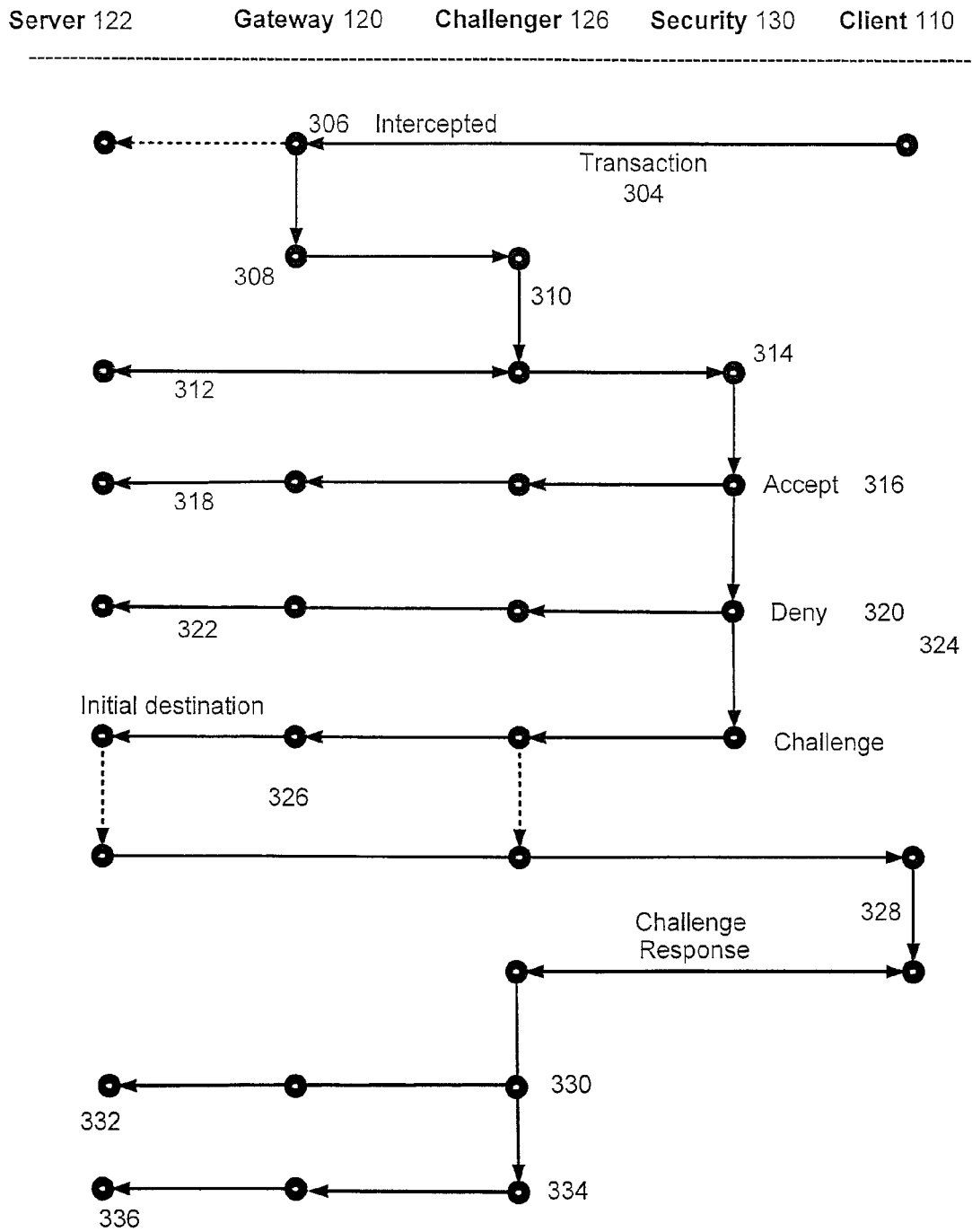
FIG. 3 is a flow chart illustrating a process for a different embodiment of the improved technique.

FIG. 3 is a flow chart illustrating a process for a different embodiment of the improved technique, specifically transaction monitoring. In an embodiment of a transaction monitoring system, a client 110 sends a transaction request 304 to server 122. Such a request may be a HTTP POST request. The gateway 120 intercepts the transaction at 306 and redirects it to the challenger 126 at 308. The challenger 126 at 310 stores the transaction 304 information in a memory and in some embodiments validates the transaction with the server 122, for example using communication channel 136 of FIG. 1. The validation may include the presence of a valid payee account number and that the transaction value is less than an amount presently in the account.

The validation from the server 122 returns at 312 to the challenger 126, which transmits security information regarding the transaction to the security analysis device 130 at 314. When the security analysis device 130 indicates a low fraud risk at 316 the security analysis device 130 transmits an accept message to the challenger 126, which at 318 transmits the stored transaction 304 to the server 122 via the gateway 120.

When the security analysis indicates a high fraud risk at 320 the security analysis device 130 transmits a deny message at 320 to the challenger 126, which is transmitted to the server 122 via the gateway 120 at 322. The server 122 may send a message including a redirection to a failure to authorize page to the client 110, or send a message about the failure to authorize to an action center or a blacklist.

When the security analysis indicates a moderate fraud risk at 324 the security analysis device 130 transmits a challenge message to the challenger 126. In some embodiments, the challenger 126 sends a redirection request to the client 110 via either the gateway 120 or via the direct communication channel 134 shown in FIG. 1. In other embodiments the redirection request is transmitted to the server 122, and then to the client 110 via the gateway 120. The redirection request is sent at 326 to the client 110 directing the client 110 to communicate with the challenger 126, for example using the bidirectional communication channel 134 shown in FIG. 1. The alternative paths in the two embodiments are shown using the dotted arrows in FIG. 3. The redirection request may include unique identifiers in order to reconstruct the original intercepted transaction 304.

At 328 the client 110 has contacted the challenger 126, the challenger 126 has transmitted a challenge question to the client 110, the client 110 has provided a response to the challenge question, and the challenger 126 has confirmed whether the response is correct. Thus at 328 the client 110 has completed a step-up authentication process involving challenge questions or out-of-band contacts, which may either result in a deny message, not permitting the transaction 304 to continue at 330, or an accept message which permits transmission of the stored transaction 304 to continue at 334 from the challenger 126 to the server 122.

If the transaction 304 is denied at 332, the server 122 may store information about the transaction 304 such as the identification of the client 110, or adaptive information such as GPS location, website identification, protocols used in the transaction, or other information useful in future authentication attempts for transactions with the client 110.

The improved techniques move the step-up security integration point to the system network layer, rather than adding increase security processes to a production server. Modifications to production servers may increase lost business activity and may increase risk of a service provider's website being down and out of operation. A down website may adversely affect a service provider's reputation and business. The improved method includes a device or an application known as the challenger, which handles the step-up security process transparently, and reduces risk for the service provider.

Another benefit of the improved method is allowing step-up security integration for systems that include third party application and software. For example, financial institutions may use third parties to provide specific parts of their web sites, such as a bank having a third party mortgage web page as part of the main web site. This may be a problem since many third party application developers do not allow access to their code, which then may not be possible to integrate into the increase security protocol process.

Yet another benefit of the improved technique is that every logon or transaction may be checked and an immediate step-up challenge may be presented whenever the specific logon or transaction merits increased security. This may be accomplished with the improved technique without having to reprogram parts of many of the electronic devices involved with a transaction.

While various embodiments of the invention have been particularly shown and described, it will be understood by those skilled in the art that various changes in form and details may be made therein without departing from the spirit and scope of the invention as defined by the appended claims.

What is claimed is:

1. A method of adding increased security to communications exchanged between a server and a client device, comprising:
    receiving an intercepted and re-routed communication between the server and the client device, the communication having an intended recipient;
    storing the re-routed communication in a memory, and communicating with the client device requesting additional security information;
    performing a security operation including the additional security information and generating a security decision;
    sending the stored communication to the intended recipient when the security decision indicates that it is safe to continue; and
    preventing the stored communication from being sent when the security decision indicates that it is not safe to continue,
    wherein receiving the intercepted and re-routed communication further comprises (1) determining whether the re-routed communication requires increased security, (2) transmitting a call to a security analysis device including information related to the intercepted communication, for generating a step-up security decision when the re-routed communication requires increased security, and (3) transmitting a challenge to the client when the step-up security decision indicates that a step-up security procedure is indicated,
    and wherein performing the security operation including the additional security information and generating a security decision further includes receiving a response to the challenge from the client and comparing the response to information in the memory to determine confirmation,
    and wherein determining whether the re-routed communication requires increased security includes determining whether the communication from the server is a communication allowing access to a resource to the client.

2. The method of claim 1, wherein the receiving, storing and performing are performed by a challenger, and further including intercepting the communication at a network gateway positioned between the server and the client and re-routing the communication from the network gateway to the challenger.

3. The method of claim 1, wherein generating a step-up security decision includes performing adaptive authentication for an intercepted login communication message being sent from the server to the client.

4. The method of claim 1, wherein generating a step-up security decision includes performing transaction monitoring for an intercepted transaction request message being sent from the client to the server.

5. The method of claim 1, wherein the transmitting of a challenge to the client includes requesting the client to provide more security information and transmitting to the client via a communications channel separate from the network gateway.

6. The method of claim 5, wherein transmitting the call to the security analysis device further includes transmitting the call via a communications channel separate from the network gateway.

7. The method of claim 1, wherein preventing the stored communication from being sent when the security decision indicates that it is not safe to continue includes transmitting a redirect communication to a logout page to the client.

8. The method of claim 7, wherein transmitting the redirect communication includes transmitting a modified version of the stored communication.

9. A system for integrating security operations into a server workflow transparently to the server, comprising:
    a controller;
    a memory device;
    a local area network communicatively coupled to an external client by at least one network gateway device;
    at least one server hosting a resource communicatively coupled to the local network; and
    a challenger communicatively coupled to the at least one network gateway device and communicatively coupled to a security analysis device;
    the network gateway device constructed and arranged to intercept and redirect communications between the server and the external client to the challenger;
    the challenger constructed and arranged to i) store information from the redirected communication in the memory and determine whether the redirected communication requires increased security, ii) transmit a call containing security information from the redirected communication to the security analysis device, for generating a step-up security decision when the redirected communication requires increased security, iii) receive a security analysis from the security analysis device, iv) transmit a challenge to the client when the step-up security decision indicates that a step-up security procedure is indicated, v) receive a response to the challenge from the client, vi) compare the response from the client to information in the memory, and vii) generate a decision on continuing the communication when the comparison to the information in the memory indicates a valid response, wherein determining whether the redirected communication requires increased security includes determining whether the communication from the server is a communication allowing access to a resource to the client.

10. The system of claim 9, further including:
the network gateway device constructed and arranged to receive a login request from the client to access a resource, and transmit the login request to the server;
the server constructed and arranged to compare information received with the login request with information stored in a database, and determine whether the information received with the login request matches the information in the database; and
the server constructed and arranged to i) transmit a communication permitting the client to access the resource to the network gateway device when the information matches the information in the database, and ii) transmit a communication not permitting the client to access the resource to the network gateway device when the information does not match the information in the database.

11. The system of claim 9, further including wherein transmitting a call to a security analysis device further includes:
the security analysis device constructed and arranged to determine, via a risk analysis process, whether the step-up security procedure is indicated; and
the security analysis device constructed and arranged to i) transmit an approval to the challenger for the stored communication to be transmitted when the risk analysis process determines that a low risk exists, ii) transmit a challenge to the challenger requesting the client to provide more security information when the risk analysis process determines that a moderate risk exists, and iii) transmit a denial of approval to the challenger for the stored communication to be transmitted analysis device when the risk analysis process determines that a high risk exists.

12. The system of claim 9, wherein the security analysis device includes an adaptive authentication system for authenticating an intercepted login communication message being sent from the server to the client.

13. The system of claim 9, wherein the security analysis device includes a transaction monitoring system for authenticating an intercepted transaction request message being sent from the client to the server.

14. The system of claim 9, wherein the security analysis device and the challenger are part of the same physical system.

15. The system of claim 9, wherein the challenger includes a direct communication link to an external network.

16. A computer program product having a non-transitory, computer-readable storage medium which stores code including instructions for adding increased security to communications exchanged between a server and a client device, which, when executed cause a controller to:
receive an intercepted and re-routed communication between the server and the client device, the communication having an intended recipient;
store the re-routed communication in a memory, and communicate with the client device to request additional security information;
perform a security operation including the additional security information and generate a security decision;
send the stored communication to the intended recipient when the security decision indicates that it is safe to continue; and
prevent the stored communication from being sent when the security decision indicates that it is not safe to continue,
wherein receiving the intercepted and re-routed communication further comprises (1) determining whether the re-routed communication requires increased security, (2) transmitting a call to a security analysis device including information related to the intercepted communication, for generating a step-up security decision when the re-routed communication requires increased security, and (3) transmitting a challenge to the client when the step-up security decision indicates that a step-up security procedure is indicated,
and wherein performing the security operation including the additional security information and generating a security decision further includes receiving a response to the challenge from the client and comparing the response to information in the memory to determine confirmation,
and wherein determining whether the re-routed communication requires increased security includes determining whether the communication from the server is a communication allowing access to a resource to the client.

17. The computer program product of claim 16, wherein the receiving, storing and performing are performed by a challenger, and further including intercepting the communication at a network gateway positioned between the server and the client and re-routing the communication from the network gateway to the challenger.

18. The computer program product of claim 16, wherein generating a step-up security decision includes performing adaptive authentication for an intercepted login communication message being sent from the server to the client.

19. The computer program product of claim 16, wherein generating a step-up security decision includes performing transaction monitoring for an intercepted transaction request message being sent from the client to the server.

20. The computer program product of claim 16, wherein the transmitting of a challenge to the client includes requesting the client to provide more security information and transmitting to the client via a communications channel separate from the network gateway.

* * * * *